(12) United States Patent
Song

(10) Patent No.: US 11,260,423 B2
(45) Date of Patent: *Mar. 1, 2022

(54) COMPOSITE MATERIALS CURED WITH THERMOPLASTIC THIN FILM COATING

(71) Applicant: The Boeing Company, Chicago, IL (US)

(72) Inventor: Weidong Song, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 79 days.

This patent is subject to a terminal disclaimer.

(21) Appl. No.: 16/678,218

(22) Filed: Nov. 8, 2019

(65) Prior Publication Data

US 2020/0070203 A1 Mar. 5, 2020

Related U.S. Application Data

(63) Continuation of application No. 15/583,322, filed on May 1, 2017, now Pat. No. 10,512,935.

(51) Int. Cl.
| | | |
|---|---|---|
| *B05D 7/00* | (2006.01) | |
| *B05D 3/00* | (2006.01) | |
| *B29C 70/08* | (2006.01) | |

(52) U.S. Cl.
CPC ............... *B05D 7/50* (2013.01); *B05D 3/007* (2013.01); *B29C 70/086* (2013.01)

(58) Field of Classification Search
CPC ......... B29C 59/14; B29C 70/08; B29C 70/60; B29C 70/603; B32B 27/288; B32B 2260/023; B32B 2305/076; B32B 2363/00
See application file for complete search history.

(56) References Cited

U.S. PATENT DOCUMENTS

| | | |
|---|---|---|
| 4,868,050 A | 9/1989 | Tanaka et al. |
| 5,141,804 A | 8/1992 | Riefler et al. |
| 9,144,841 B1 | 9/2015 | Ghabchi et al. |
| 2011/0009528 A1* | 1/2011 | Tomioka ............ C08G 59/5033 523/428 |
| 2011/0143619 A1 | 6/2011 | Luinge et al. |
| 2014/0110633 A1 | 4/2014 | Pratte et al. |
| 2015/0174872 A1 | 6/2015 | Bonneau et al. |
| 2016/0221223 A1 | 8/2016 | Pratte et al. |

OTHER PUBLICATIONS

Cech, J., Characteristics of Bis F and Phenol Novolac Epoxy Resins; Compositional differences and their effect on Performance, Polymer Degradation and Stability, Jul. 2, 2004, pp. 285-292, CVC Specialty Chemicals, Inc.

* cited by examiner

*Primary Examiner* — Ana L. Woodward
(74) *Attorney, Agent, or Firm* — Coats & Bennett, PLLC

(57) ABSTRACT

Methods, systems, and apparatuses are disclosed for making co-cured coated composite material comprising composite material prepreg stacks and a coating material, with the coating material comprising an outer layer of thermoplastic film, with the coating material co-cured with the composite material, with the co-cured coating material providing a compressive force on the co-cured coated composite material, components comprising the co-cured coated composite material, and larger structures comprising the co-cured coated composite materials.

23 Claims, 6 Drawing Sheets

COMPOSITE MATERIALS CURED WITH THERMOPLASTIC THIN FILM COATING

CROSS-REFERENCE

This application is a continuation of U.S. patent application Ser. No. 15/583,322, filed May 1, 2017, and issued Dec. 24, 2019 as U.S. Pat. No. 10,512,935.

TECHNOLOGICAL FIELD

The present disclosure is directed generally to composite materials, as well as composite components made from the composite materials, and larger structures comprising the composite components. More specifically, the disclosure is directed to the manufacture of coated composite materials, and the coated composite components made according to disclosed methods, where the coating and the composite material may be co-cured, and the coating comprises a thermoplastic film.

BACKGROUND

Carbon fiber reinforced plastic materials (CFRPs) have utility in structures including, without limitation, vehicles including, without limitation, aircraft. CFRPs comprise a fiber material (e.g. carbon fibers, etc.) impregnated with a resin material (e.g. epoxy resin, acrylic resin, etc.) to make so-called prepregs. Prepregs are partially cured layers that can be manufactured into rolls that can yield unrolled sheets for use in composite material manufacture. Prepreg material, or "prepregs" can then be "laid-up" or "stacked" into multilayered "stacks" that can be shaped on forming mandrels or other tooling, followed by curing or partially curing the shaped material to produce a composite material that, if desired, adopts desired and predetermined shapes and dimensions imparted by the tool, with the composite material having desired weight and strength. Alternately, prepregs may be oriented into a stack that is trimmed and cured to form a solid stack for use as a composite material structure or other type of composite component.

CRFPs can be used as structural components in aircraft (e.g. stringers, spars, ribs, etc.). Over time, a composite material, such as those comprising CFRPs, may experience fissures or cracks, requiring repair or replacement. Such repair or replacement is time-consuming and costly as the larger structure comprising the composite material must be taken out of service. Attempts to protect components comprising CFRPs and other composite materials can include an overwrap, or other layer, for example, a cured fabric layer, to afford a compressive force to, and otherwise reinforce and protect the composite material. However, at times, protective overwrap materials, such as, for example, curable fabric material shells, etc., may possess characteristics that can contribute to the degradation of the underlying composite material. For example, if an overwrap shell material has a different coefficient of thermal expansion (CTE), and/or a different Young's modulus as compared with the CTE and modulus of the composite material the overwrap material may not afford the composite material adequate protection from damage or degradation, and may contribute to such degradation. For the purpose of the present disclosure, the term "modulus" is used equivalently and is therefore interchangeable with the term "Young's modulus", unless explicitly stated otherwise.

A mismatch in the CTE and/or modulus of the composite stack and the shell material overwrapping the composite stack can cause damage to the composite stack of the stacked-up prepreg ply assembly (e.g. the composite material "stack") shrinks or expands to a greater extent as compared to the overwrap shell. As a result, curing and "wrapping" stages during manufacture of the composite component, as well as conditions experienced by the wrapped composite material in use, may result in thermo-stress and cause fissures, cracks, and/or micro-cracks at the edges of the composite material stack. Such cracks often initiate at the composite material edge. If detected upon component inspection, such composite material damage results in the rejection of such a composite component or part, creating material waste and increased manufacturing cost. If damage occurs to a composite component that has been installed in a larger structure and is "in service", repair or replacement of the damaged composite part may be required, also resulting in material waste, and increased cost while the larger structure comprising the composite component is taken out of service for repair.

Further, composite components made from composite materials may be used in the manufacture of larger structures (e.g. aircraft). Such structures may encounter electromagnetic effects (EMEs) including, for example, and without limitation, lightning strikes. When a structure encounters an EME, the charge delivered to the structure travels throughout any conductive path, and can cause damage to exposed dielectric materials, including composite materials. The electrical damage to composite materials from EMEs can be exacerbated if the edges of the composite material comprise exposed carbon fibers.

SUMMARY

According to one aspect, the present disclosure is directed to a method for making a coated composite component comprising positioning a plurality of prepreg plies to form a prepreg ply stack; coating the prepreg ply stack with a thermoplastic film, with the thermoplastic film comprising a thermoplastic film first surface and a thermoplastic film second surface, and with the thermoplastic film first surface located proximate to the prepreg ply stack; and curing the prepreg ply stack and the thermoplastic film to make a coated composite component, wherein the thermoplastic film comprises a coefficient of thermal expansion ranging from about 20 to about 70 ppm/° F., (i.e. $2 \times 10^{-5}$/in/in/° F. to $7 \times 10^{-5}$/in/in/° F.) at a temperature ranging from about 60° F. to about 350° F.

In another aspect, before the step of coating the prepreg ply stack with a thermoplastic film, further comprising plasma treating at least the first surface of the thermoplastic film.

In a further aspect, in the step of coating the prepreg ply stack with a thermoplastic film, said thermoplastic film comprises a polyether ether ketone or a polyether ketone ketone.

In another aspect, in the step of curing the prepreg ply stack and the thermoplastic film, the prepreg ply stack and the thermoplastic film are cured at a temperature ranging from about 250° F. to about 350° F.

In another aspect, the plurality of prepreg plies comprises a resin-containing component and a fiber-containing component.

In another aspect, the plurality of prepreg plies comprises an epoxy-containing resin component and a fiber-containing component.

In a further aspect, the plurality of prepreg plies comprises an epoxy-containing resin component and a fiber-containing component, with the fiber-containing component comprising at least one of: carbon fibers, glass fibers, boron fibers, aramid fibers, or combinations thereof.

In another aspect, the plurality of prepreg plies each comprises a B-stage epoxy-resin.

In a further aspect, the plurality of prepreg plies comprises an epoxy-resin-containing component comprising at least one of: digylcidyl ethers of bisphenol A; diglycidyl ethers of bisphenol F; N,N,N',N'-tetragylcidyl-4,4'-diaminophenylmethane; p-amino phenol triglycidyl ether; epoxy phenol novolac resins; epoxy cresol novolac resins; 1,3,5-triglycidyl isocyanurate; tris(2,3-epoxypropyl)isocyanurate (and isocyanurates); glycerol diglycidyl ether; trimethylolpropane triglycidyl ether, or combinations thereof.

According to the present disclosure, a further aspect is directed to a composite material comprising a plurality of prepreg plies configured into a prepreg ply stack, with the prepreg ply stack comprising a thermoplastic film, and with the thermoplastic film comprising a thermoplastic film first surface and a thermoplastic film second surface, with the thermoplastic film first surface located proximate to the prepreg ply stack; and wherein said thermoplastic film has a coefficient of thermal expansion ranging from about 20 to about 70 ppm/° F. at a temperature ranging from about 60° F. to about 350° F.

In another aspect, the co-cured thermoplastic film comprises a polyether ether ketone or a polyether ketone ketone.

In another aspect, the prepreg stack comprising the thermoplastic film is cured at a temperature ranging from about 250° F. to about 350° F.

In another aspect, the plurality of prepreg plies comprises a resin-containing component and a fiber-containing component.

In another aspect, the plurality of prepreg plies comprises an epoxy-containing resin component and a fiber-containing component.

In a further aspect, the fiber-containing component comprises carbon fibers, glass fibers, boron fibers, aramid fibers, or combinations thereof.

In another aspect, the prepreg plies comprise a B-stage epoxy-resin.

In a further aspect, the prepreg plies comprise an epoxy resin, said epoxy resin comprising at least one of: digylcidyl ethers of bisphenol A; diglycidyl ethers of bisphenol F; N,N,N',N'-tetragylcidyl-4,4'-diaminophenylmethane; p-amino phenol triglycidyl ether; epoxy phenol novolac resins; epoxy cresol novolac resins; 1,3,5-triglycidyl isocyanurate; tris(2,3-epoxypropyl)isocyanurate (and isocyanurates); glycerol diglycidyl ether; trimethylolpropane triglycidyl ether, or combinations thereof.

In a further aspect, the thermoplastic film material comprises a Young's modulus value ranging from about 3 GPa to about 20 GPa.

In another aspect, the coefficient of thermal expansion of the thermoplastic film is greater than the coefficient of thermal expansion of the prepreg ply stack.

A further aspect of the present disclosure is directed to a composite component comprising a composite material comprising a plurality of prepreg plies to form a prepreg ply stack; and a coating proximate to the prepreg ply stack, with the coating comprising a thermoplastic film, and with the thermoplastic film comprising a first coefficient of thermal expansion ranging from about 30 to about 60 ppm/° F. at a temperature ranging from about 60° F. to about 350° F.

In another aspect, the thermoplastic film comprises a polyether ether ketone or a polyether ketone ketone.

In a further aspect, the prepreg ply stack comprises a resin-component and a fiber-containing component, with the fiber-containing component comprising at least one of: carbon fibers, glass fibers, boron fibers, aramid fibers, or combinations thereof.

In another aspect, the cured prepreg ply stack experiences an amount of interlaminar stress tension that is less than an amount of interlaminar stress tension required to introduce cracks in the prepreg ply stack.

In another aspect, the cured composite material experiences an amount of interlaminar stress tension that is less than an amount of interlaminar stress tension required to introduce cracks in the composite material.

In a further aspect, the thermoplastic film is configured to apply a compressive preload to the composite material.

In a further aspect, the thermoplastic film is configured to apply a compressive preload ranging from about 0.5 psi to about 10 psi to the composite material.

In another aspect, the thermoplastic film material comprises a coefficient of thermal expansion value that is greater than the coefficient of thermal expansion value of the composite material.

Aspects of the present disclosure are further directed to structures comprising a composite component comprising a composite material, with the composite material comprising a plurality of prepreg plies configured into a prepreg ply stack, with the prepreg ply comprising a thermoplastic film, and with the thermoplastic film comprising a thermoplastic film first surface and a thermoplastic film second surface, with the thermoplastic film first surface located proximate to the prepreg ply stack; and wherein the thermoplastic film has a coefficient of thermal expansion ranging from about 20 to about 70 ppm/° F., (i.e.$2\times10^{-5}$/in/in/° F. to $7\times10^{-5}$/in/in/° F.) at a temperature ranging from about 60° F. to about 350° F.

In a further aspect, the thermoplastic film comprises a first a coefficient of thermal expansion ranging from about 30 to about 60 ppm/° F. at a temperature ranging from about 60° F. to about 350° F.

In another aspect, the thermoplastic film comprises a polyether ether ketone or a polyether ketone ketone.

In another aspect, the composite material of the composite component experiences an amount of interlaminar stress tension that is less than an amount of interlaminar stress tension required to introduce cracks in the composite material.

Another aspect of the present disclosure is directed to a vehicle comprising a composite component comprising a composite material, with the composite material comprising a plurality of prepreg plies configured into a prepreg ply stack, with the prepreg ply comprising a thermoplastic film, and with the thermoplastic film comprising a thermoplastic film first surface and a thermoplastic film second surface, with the thermoplastic film first surface located proximate to the prepreg ply stack; and wherein the thermoplastic film comprises a coefficient of thermal expansion ranging from about 20 to about 70 ppm/° F. at a temperature ranging from about 60° F. to about 350° F.

According to a further aspect the vehicle is an aircraft.

In another aspect, the vehicle is selected from the group consisting of a manned aircraft, an unmanned aircraft, a manned spacecraft, an unmanned spacecraft, a manned rotorcraft, an unmanned rotorcraft, a satellite, a rocket, a manned terrestrial vehicle, an unmanned terrestrial vehicle, a manned surface water borne vehicle, an unmanned surface water borne vehicle, a manned sub-surface water borne vehicle, an unmanned sub-surface water borne vehicle, and combinations thereof.

In a further aspect, the thermoplastic film is configured to apply a compressive preload to the composite material, with the compressive preload ranging from about 0.5 psi to about 10 psi.

BRIEF DESCRIPTION OF THE DRAWINGS

Figure 1:
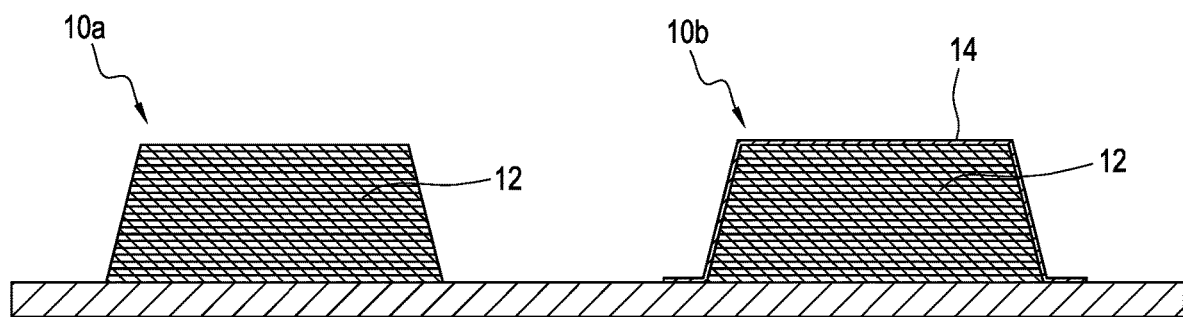
Figure 2:
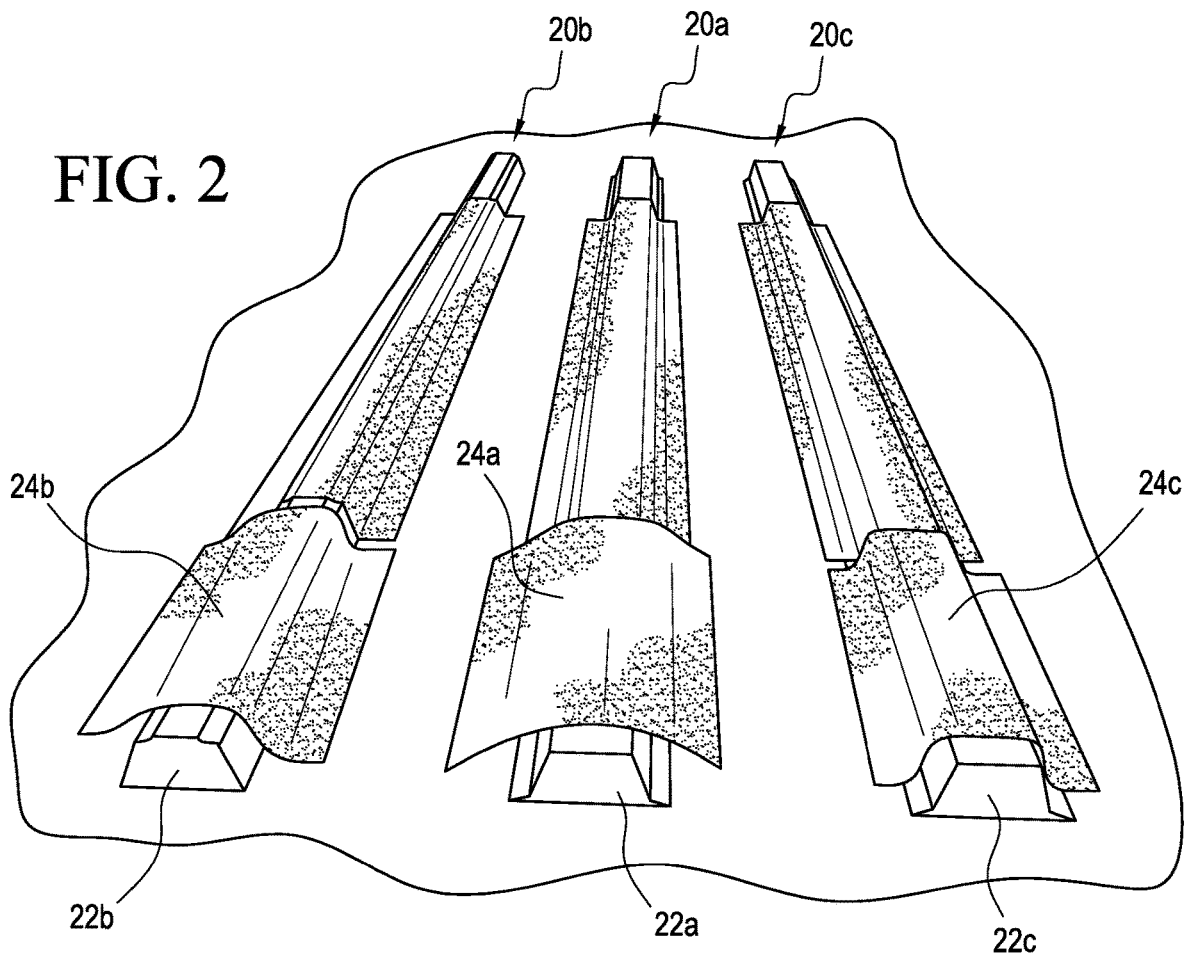
Figure 3:
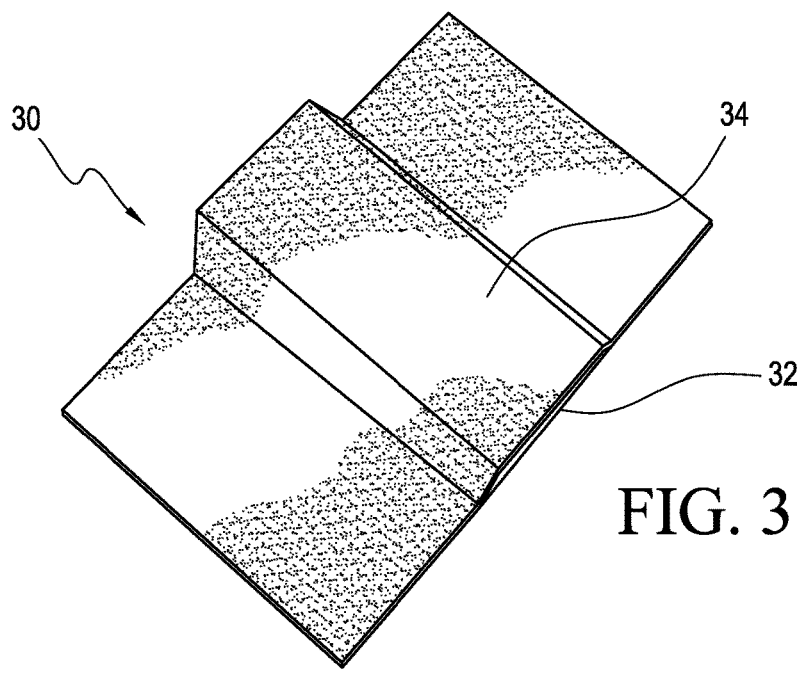

Having thus described variations of the disclosure in general terms, reference will now be made to the accompanying drawings, which are not necessarily drawn to scale, and wherein:

FIG. 1 is a cross-sectional side view of an aspect of the present disclosure;

FIG. 2 is a perspective elevated view of an aspect of the present disclosure;

FIG. 3 is a perspective elevated view of an aspect of the present disclosure; and FIGS. 4-7 are flowcharts outlining aspects of the present disclosure.

DETAILED DESCRIPTION

According to aspects of the present disclosure, methods for making composite laminate materials comprising composite "stacks" are disclosed, as well as the composite materials made according to such methods, and structures comprising such composite materials.

Aspects of the present disclosure relate to methods for manufacturing composite materials where composite material edge cracking due to factors including, for example, CTE mismatch between the composite material and an overwrapping material is reduced or substantially eliminated.

Aspects of the present disclosure comprise providing a composite material overwrap comprising a thermoplastic material film. The thermoplastic material film comprises a coefficient of thermal expansion ranging from about 20 to about 70 ppm/° F. at a temperature ranging from about 60° F. to about 350° F., and a Young's modulus that is lower than the modulus of the composite material.

In another aspect, the thermoplastic film comprises a polyether ether ketone (PEEK) or a polyether ketone ketone (PEKK) or thermoplastic materials having similar properties including, for example CTE, to PEEK and/or PEKK.

Polyether ether ketone (PEEK) is an organic thermoplastic in the polyaryletherketone (PAEK) family, with PEEK having the general formula:

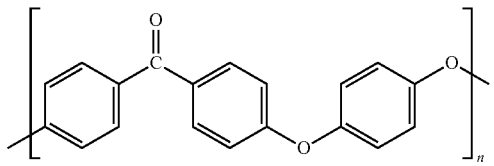

PEEK has a coefficient of thermal expansion value (depending upon grade) ranging from of about 20 to about 80 ppm/° F. (i.e. about 2 to about $8 \times 10^{-5}$ in/in/° F.), a Young's modulus value of about 3.6 GPa and a tensile strength ranging from about 90 MPa to about 100 MPa. PEEK is highly resistant to thermal degradation as well as attack by both organic and aqueous environments (e.g. environments including, without limitation, those environments coming into contact with fuels and fuel systems, etc.), and has a high resistance to biodegradation.

Polyether ketone ketone (PEKK) is a semi-crystalline thermoplastic in the PAEK family, with PEKK having the general formula:

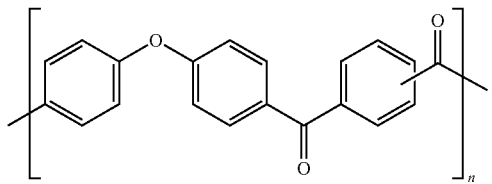

PEKK has a coefficient of thermal expansion value (depending upon grade) of about 10 to about 20 ppm/° F. (i.e. about 1 to about $2 \times 10^{-5}$ in./in/° F.), a Young's modulus value of about 4.5 GPa and a tensile strength of about 102 MPa. PEKK is also highly resistant to thermal degradation as well as attack by both organic and aqueous environments (e.g. environments including, without limitation, those environments coming into contact with fuels and fuel systems, etc.), and has a high resistance to biodegradation.

As contemplated by the present disclosure, the CFRPs used to make the composite material stacks typically have a coefficient of thermal expansion (CTE) value ranging from of about 20 to about 30 ppm/° F. A disparity in CTE value between thermoplastic film overwraps used to cover the CFRPs, means that, upon CFRP curing, or during use as a wrapped composite component, the contemplated thermoplastic films can shrink more than the CRFP (e.g. composite material) stack, resulting in the thermoplastic film applying a compressive force, or preload, on the CRFP stack that reduces, or substantially eliminate cracks or fissures from initiating in the CFRP stack, particularly at the edges (e.g. edge cracking).

As a result, the thermoplastic coatings according to the present disclosure afford the composite material stack, and components comprising the composite material, improved EME protection, as the continuous thermoplastic film provides a barrier to and otherwise covers exposed carbon fiber ends at the edges of the CFRPs. This level of EME protection afforded the CFRPs by the presence of the thermoplastic film coating, or overwrap, therefore provides superior corrosion protection (e.g. protection from galvanic corrosion that would otherwise occur without the presence of the thermoplastic film) of the CRFPs and metal components that are located proximate to the CFRP stacks. Contemplated thicknesses of the thermoplastic film range from about 2 to about 20 mils thick, and preferably ranges from about 3 to about 5 mils thick); a thickness that is significantly less than conventional CFRP wrappings made from fabric (e.g. about 8 mils thick).

In addition, the density of the contemplated thermoplastic film materials (e.g. contemplated thermoplastic film densities ranging from about 1.3 to about 1.4 g/cc) is also lower than the density of the fabrics presently used to cover, or "wrap", composite material stacks. This reduction in material density and film thickness yields a measurable weight reduction. For example, over the area of an aircraft, such weight reduction can reach or exceed about 300 pounds, representing a substantial cost savings in terms of fuel consumption.

If desired, according to further contemplated aspects, the thermoplastic film may be tailored to possess various characteristics (e.g. physical, chemical, thermal, etc.) by providing additives to the thermoplastic. For example, the contemplated thermoplastic films can be tailored to achieve a desired surface resistivity ranging from about $10^5$ to $10^{11}$ ohm/m$^2$. Components made from the composite materials disclosed herein may find particular utility in components used in the manufacture of vehicles, including aircraft, (e.g. ribs, spars, stringers, etc.) as well as structural components used in the manufacture of fuel tanks on such vehicles.

In addition, the contemplated thermoplastic films offer significantly greater processing advantages in terms of material handling and storage compared with fabric overwrap that may, for example, require cool storage, thus further reducing facility space, processing complexity, and overall cost. In addition, aspects of the present disclosure contemplate the use of thermoplastic wraps or coatings to afford greater protection from moisture, thereby acting as an enhanced moisture barrier as compared to the fabric overwraps presently in use.

In a further aspect, the prepreg plies to make the composite materials comprise an epoxy-containing resin component and a fiber-containing component, with the fiber-containing component comprising carbon fibers, glass fibers, boron fibers, aramid fibers, etc. or combinations thereof.

In another aspect, the prepreg ply stacks comprise a B-stage epoxy-resin.

In a further aspect, the prepreg ply stacks comprise an epoxy-resin-containing component comprising digylcidyl ethers of bisphenol A; diglycidyl ethers of bisphenol F; N,N,N',N'-tetragylcidyl-4,4'-diaminophenylmethane; p-amino phenol triglycidyl ether; epoxy phenol novolac resins; epoxy cresol novolac resins; 1,3,5-triglycidyl isocyanurate; tris(2,3-epoxypropyl)isocyanurate (and isocyanurates); glycerol diglycidyl ether; trimethylolpropane triglycidyl ether, or combinations thereof. The present disclosure further contemplates that the prepreg plies (e.g. the composite material comprising the prepreg ply stacks that in turn comprise the prepreg plies), may be based on a system other than an epoxy resin-based system including, without limitation, an acrylate resin-based system, a composite system comprising benzoazine, etc.

As shown in FIG. 1, prepreg stack 10a comprises a plurality of laid-up prepreg plies 12. Coated composite component 10b shows an aspect of the present disclosure, where the prepreg stack 10a comprises a plurality of laid-up prepreg plies 12 and a thermoplastic coating 14 applied to the exterior to substantially completely cover the coated composite component 10b.

FIG. 2 shows a perspective elevated view of the coated composite material according to aspects of the present disclosure, at various stages during its manufacture. At stage 20a, composite prepreg ply stack 22a has thermoplastic film 24a brought into a position proximate to the composite prepreg ply stack 22a. At stage 20b, the thermoplastic film 24b is oriented into a final position relative to composite prepreg ply stack 22b. Stage 20c illustrates a composite prepreg ply stack 22c comprising the thermoplastic film 24c.

FIG. 3 shows a perspective elevated view of a composite component 30 with cured composite material 32 covered by thermoplastic film 34.

Figure 4:
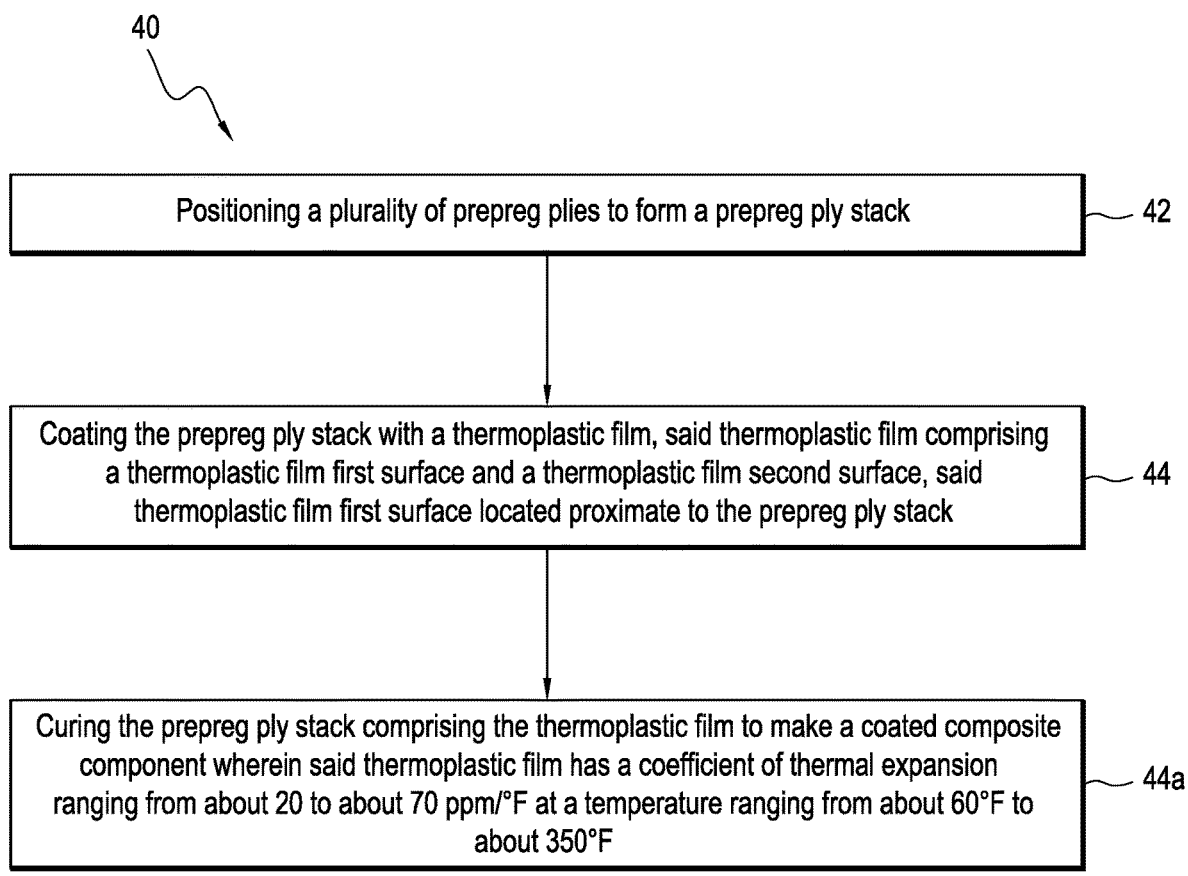

FIGS. 4-7 are flowcharts outlining aspects of the present disclosure. FIG. 4 outlines a method (40) comprising (42) positioning a plurality of prepreg plies to form a prepreg ply stack; (44) coating the prepreg ply stack with a thermoplastic film, said thermoplastic film comprising a thermoplastic film first surface and a thermoplastic film second surface, said thermoplastic film first surface located proximate to the prepreg ply stack; and (44a) curing the prepreg ply stack comprising the thermoplastic film to make a coated composite component wherein the thermoplastic film has a coefficient of thermal expansion ranging from about 20 to about 70 ppm/° F. at a temperature ranging from about 60° F. to about 350° F.

Figure 5:
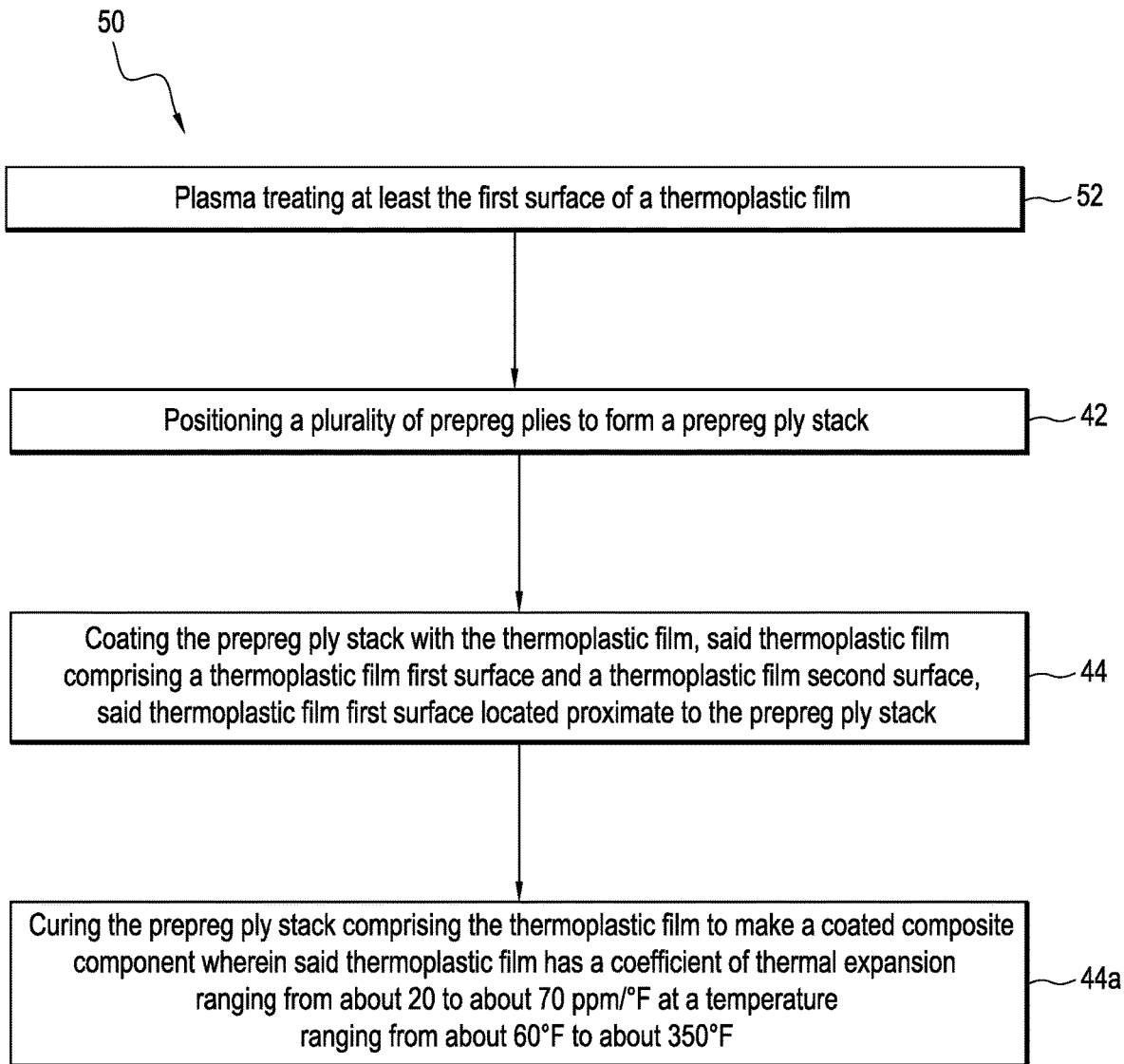

FIG. 5 outlines a method (50) comprising (52) plasma treating at least the first surface of a thermoplastic film: (42) positioning a plurality of prepreg plies to form a prepreg ply stack: (44) coating the prepreg ply stack with the thermoplastic film, said thermoplastic film comprising a thermoplastic film first surface and a thermoplastic film second surface, said thermoplastic film first surface located proximate to the prepreg ply stack; and (44a) curing the prepreg ply stack comprising the thermoplastic film to make a coated composite component wherein the thermoplastic film has a coefficient of thermal expansion ranging from about 20 to about 70 ppm/° F. at a temperature ranging from about 60° F. to about 350° F.

Figure 6:
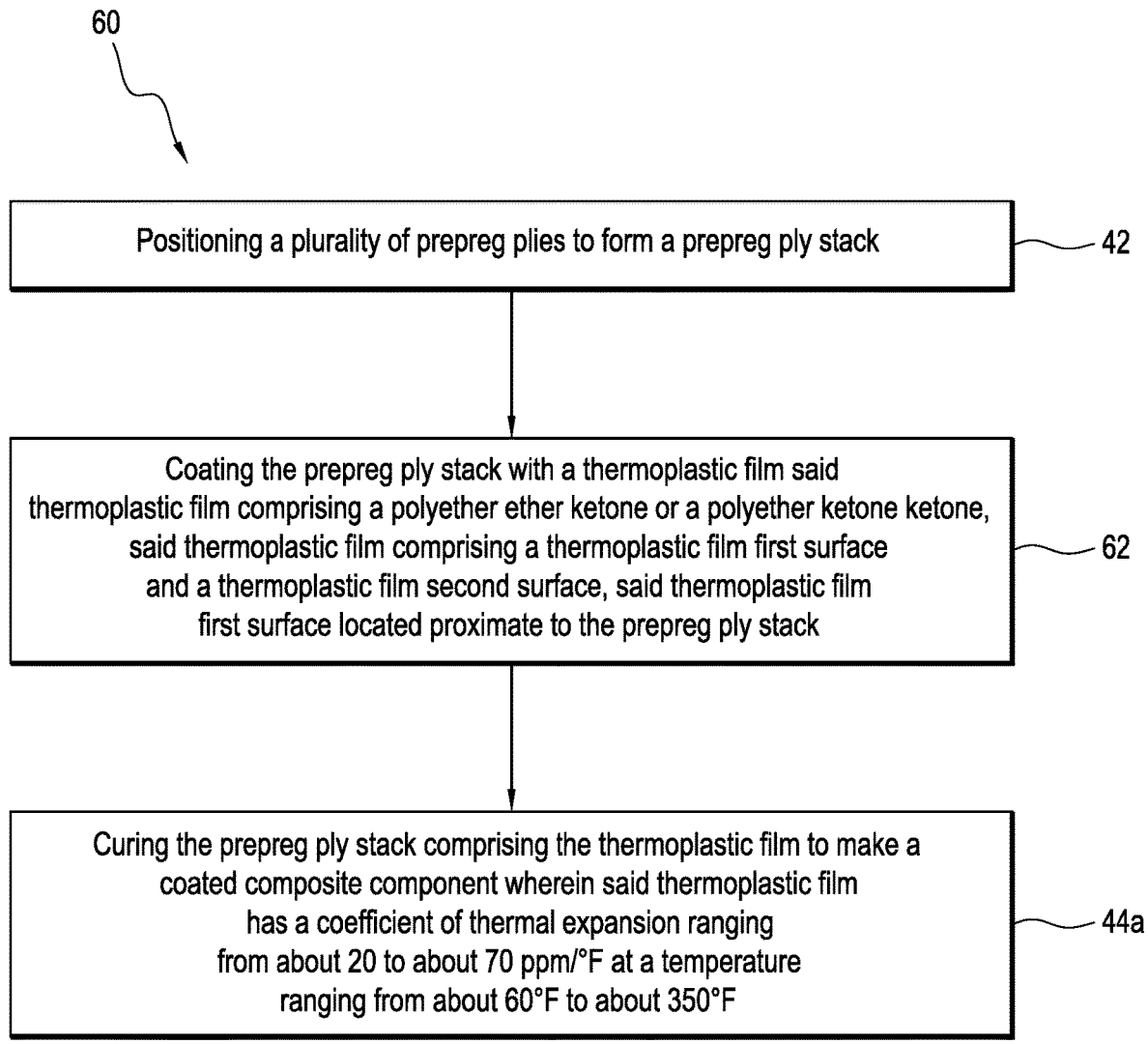

FIG. 6 outlines a method (60) comprising (42) positioning a plurality of prepreg plies to form a prepreg ply stack; (62) coating the prepreg ply stack with a thermoplastic film comprising said thermoplastic film comprising a polyether ether ketone or a polyether ketone ketone, said thermoplastic film comprising a thermoplastic film first surface and a thermoplastic film second surface, said thermoplastic film first surface located proximate to the prepreg ply stack; and (44a) curing the prepreg ply stack comprising the thermoplastic film to make a coated composite component wherein the thermoplastic film has a coefficient of thermal expansion ranging from about 20 to about 70 ppm/° F. at a temperature ranging from about 60° F. to about 350° F.

Figure 7:
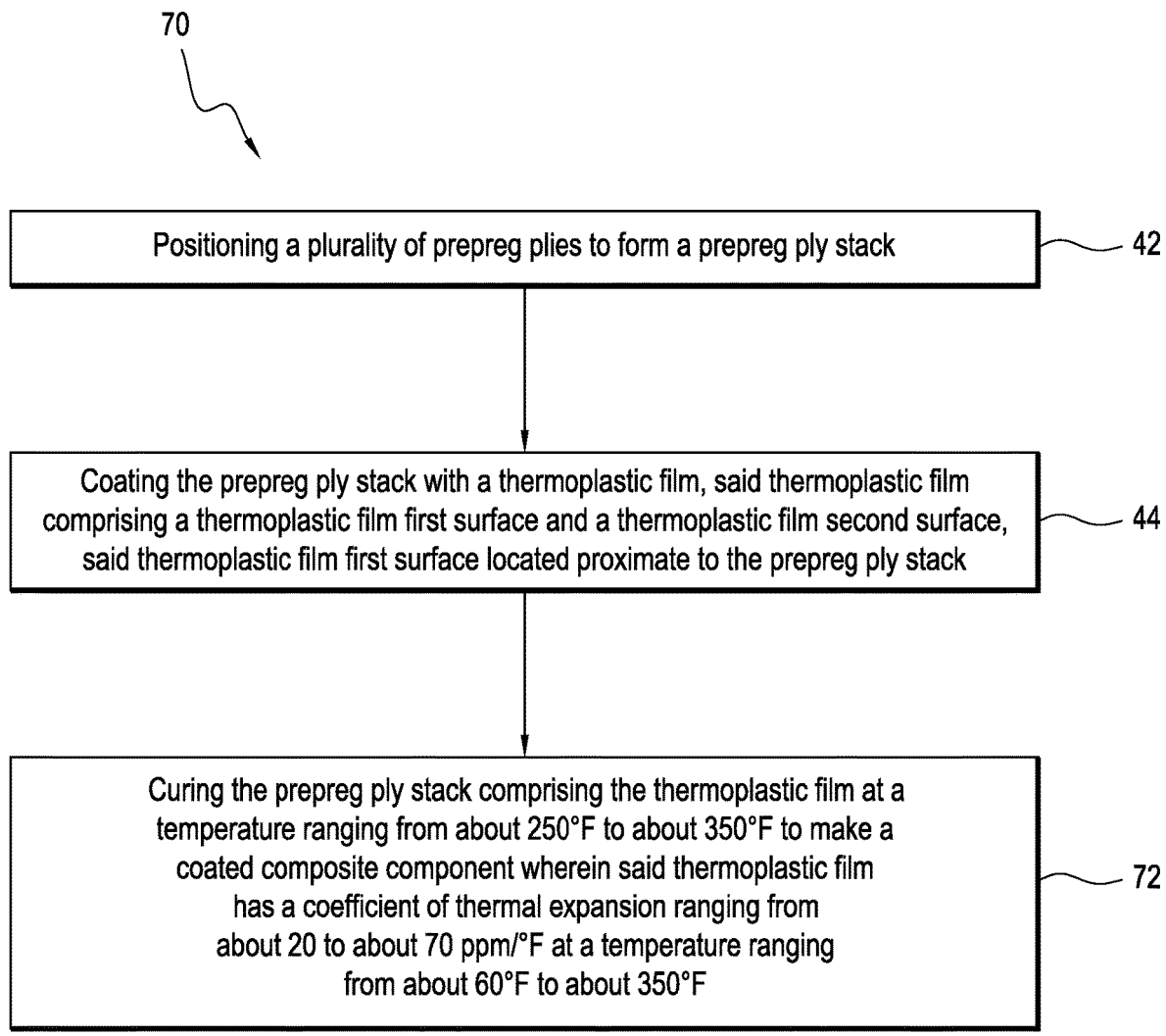

FIG. 7 outlines a method (70) comprising (42) positioning a plurality of prepreg plies to form a prepreg ply stack; (44) coating the prepreg ply stack with a thermoplastic film, said thermoplastic film comprising a thermoplastic film first surface and a thermoplastic film second surface, said thermoplastic film first surface located proximate to the prepreg ply stack; and (72) curing the prepreg ply stack comprising the thermoplastic film at a temperature ranging from about 250° F. to about 350° F. to make a coated composite component wherein the thermoplastic film has a coefficient of thermal expansion ranging from about 20 to about 70 ppm/° F. at a temperature ranging from about 60° F. to about 350° F.

Further aspects of the present disclosure contemplate methods for treating the thermoplastic film before applying the thermoplastic film to the composite prepreg ply stack. Such treatments include, without limitation, plasma treating the thermoplastic film to activate the at least one surface of the thermoplastic film. "Plasma treatment", also referred to equivalently herein as "plasma surface activation", predictably alters the surface of a polymer by attaching polar or functional groups to the polymer. Such plasma treatment is especially useful when attempting to bond a chemically inert polymer that may not bond easily to other materials. Plasma-treated surfaces may remain active for several months. According to known plasma treatment methods, radiation (e.g. ultraviolet, etc.) and active oxygen species from a produced plasma break up a material surface allowing active oxygen species (e.g. radicals) from the plasma to bind to the active sites created on the treated material surfaces, thus creating a material surface that is highly active to bonding to other material surfaces.

EXAMPLE

The following example outlines a general method for providing a PEEK or PEKK thermoplastic wrap or coating for a co-curable composite (e.g. CFRP) stack. A PEEK or PEKK thermoplastic film is plasma treated to increase the surface reactivity of the thermoplastic film. For example, PEEK films may be treated at 0.5" height and 300"/min at predetermined ion density levels. The PEEK or PEKK thermoplastic film is oriented onto the co-curable composite stack as a co-curable thermoplastic over-wrap. The stack with thermoplastic over-wrap is co-cured in an autoclave that is programmed for suitable vacuum and pressurization as usual. A progressive heating cycle is established for the autoclave at: 1) 3° F./min until a temperature of 220° F. is achieved, based on air temperature; 2) 1.2° F./min to 310° F., based on air temperature; 3) 0.4 F/min to 355° F., based on air temperature, while observing the lagging thermocouple. When the lagging thermocouple reached 345° F., observe a 150 minute hold. The co-curing thermoplastic film and stack are allowed to cool at 3° F./min, based on air temperature. When the leading thermocouple registers a temperature of less than 140° F., pressure is reduced to complete the cycle. For the purpose of this specification, when referring to the PEEK and/or PEKK thermoplastic film, the terms "wrap", "over-wrap", "wrapping", and "coating" are equivalent terms and may be used interchangeably. The present disclosure therefore contemplates a thermoplastic film applied to an uncured composite material comprising a prepreg ply stack. In this aspect, the thermoplastic film is subjected to the curing process for the composite material as outlined in the Example set forth immediately above. According to aspects of the present disclosure, the thermoplastic film is provided to the uncured or partially-cured composite material as a wrap. The thermoplastic film then becomes bonded to the composite material as the composite material with the thermoplastic film proceeds through the composite material curing process. While it is recognized that the chemical structure of the thermoplastic film is not changed during the curing process, for the purposes of the present disclosure the process may be equivalently referred to as a "curing" process or a "co-curing" process, with the terms being used interchangeably.

Further aspects of the present disclosure contemplate structural and other components for vehicles including, without limitation, aircraft (e.g. spars, ribs, stringers, etc.), with such components finding utility in connection with vehicle fuel tanks and fuel tank systems. Such vehicles may be selected from the group consisting of a manned aircraft, an unmanned aircraft, a manned spacecraft, an unmanned spacecraft, a manned rotorcraft, an unmanned rotorcraft, a satellite, a rocket, a manned terrestrial vehicle, an unmanned terrestrial vehicle, a manned surface water borne vehicle, an unmanned surface water borne vehicle, a manned sub-surface water borne vehicle, an unmanned sub-surface water borne vehicle, and combinations thereof.

The aspects presented in the present disclosure may, of course, be carried out in other ways than those specifically set forth herein without departing from essential characteristics of the disclosed aspects. The present aspects are to be considered in all respects as illustrative and not restrictive, and all changes coming within the meaning and equivalency range of the appended claims are intended to be embraced therein.

What is claimed is:

1. A co-cured composite material comprising:
a co-cured prepreg ply stack configured into a shaped composite material, said shaped composite material comprising an epoxy-containing resin component and a fiber-containing component, said shaped composite material further comprising at least one shaped composite material edge, said shaped composite material further comprising a shaped composite material exterior; and
a co-cured continuous coating configured to coat the shaped composite material exterior, said co-cured continuous coating further configured to coat the at least one shaped composite material edge, said co-cured continuous coating comprising:
a thermoplastic film, said thermoplastic film comprising a thermoplastic film first surface and a thermoplastic film second surface, said thermoplastic film first surface located proximate to the shaped composite material exterior;
wherein said thermoplastic film has a thickness ranging from about 3 to about 5 mils, said thermoplastic film configured to overwrap the shaped composite material, said thermoplastic film comprising a coefficient of thermal expansion ranging from about 20 to about 70 ppm/° F. at a temperature ranging from about 60° F. to about 350° F.; and
wherein the co-cured continuous coating is configured to apply a compressive preload to the co-cured shaped composite material, said compressive preload ranging from about 0.5 psi to about 10 psi.

2. The co-cured composite material of claim 1, wherein the thermoplastic film comprises: a polyether ether ketone or a polyether ketone ketone.

3. The co-cured composite material of claim 1, wherein said fiber-containing component comprises at least one of: carbon fibers, glass fibers, boron fibers, aramid fibers, or combinations thereof.

4. The co-cured composite material of claim 1, wherein the coefficient of thermal expansion of the co-cured thermoplastic film is greater than the coefficient of thermal expansion of the co-cured prepreg ply stack.

5. The co-cured composite material of claim 1, wherein, the co-cured prepreg ply stack comprises a B-stage epoxy-resin.

6. The co-cured composite material of claim 1, wherein, the co-cured prepreg ply stack comprises an epoxy-resin containing component comprising at least one of:
digylcidyl ethers of bisphenol A; diglycidyl ethers of bisphenol F; N,N,N',N'-tetragylcidyl-4,4'-diaminophenylmethane; p-amino phenol triglycidyl ether;
epoxy phenol novolac resins; epoxy cresol novolac resins; 1,3,5-triglycidyl isocyanurate; tris(2,3-epoxypropyl) isocyanurate; glycerol diglycidyl ether;
trimethylolpropane triglycidyl ether, or combinations thereof.

7. The co-cured composite material of claim 1, wherein the co-cured continuous coating comprises a density ranging from about 1.3 to about 1.4 g/cc.

8. The co-cured composite component of claim 1, wherein the thermoplastic film has a resistivity ranging from about $10^5$ to $10^{11}$ ohm/m$^2$.

9. An aircraft comprising the co-cured composite material of claim 1.

10. A composite component comprising the co-cured composite material of claim 1.

11. An aircraft comprising the co-cured composite component claim 10.

12. A vehicle comprising the co-cured composite material of claim 1, said vehicle selected from the group consisting of:
a manned rotorcraft, an unmanned rotorcraft, a satellite, a rocket, a manned terrestrial vehicle, an unmanned terrestrial vehicle, a manned surface water borne vehicle, an unmanned surface water borne vehicle, a manned sub-surface water borne vehicle, an unmanned sub-surface water borne vehicle, and combinations thereof.

13. The co-cured composite material of claim 1, wherein the co-cured continuous coating has a density ranging from about 1.3 to about 1.4 g/cc.

14. The co-cured composite material of claim 1, wherein the co-cured thermoplastic film has a Young's modulus value ranging from about 3 GPa to about 20 GPa.

15. The co-cured composite material of claim 1, wherein the co-cured thermoplastic film comprises a coefficient of thermal expansion that is greater than the coefficient of thermal expansion of the co-cured composite material prepreg ply stack.

16. A method for making a co-cured coated composite component comprising:
    positioning a plurality of prepreg plies to form a prepreg ply stack said prepreg ply stack comprising a plurality of prepreg plies, said prepreg plies comprising an epoxy-containing resin component and a fiber-containing component;
    coating the prepreg ply stack with a thermoplastic film to form a thermoplastic film coating, said thermoplastic film comprising a thermoplastic film first surface and a thermoplastic film second surface, said thermoplastic film first surface located proximate to the prepreg ply stack, said thermoplastic film coating configured to completely coat the prepreg ply stack;
    co-curing the prepreg ply stack comprising the thermoplastic film to form a co-cured coated composite component;
    wherein the thermoplastic film has a coefficient of thermal expansion that ranges from about 20 to about 70 ppm/° F. at a temperature from about 60° F. to about 350° F.; and
    wherein the thermoplastic film is configured to apply a compressive preload to the co-cured prepreg ply stack, said compressive preload ranging from about 0.5 psi to about 10 psi.

17. The method of claim 16, before the step of coating the prepreg ply stack with a thermoplastic film, further comprising:
    plasma treating at least the thermoplastic film first surface.

18. The method of claim 16, wherein, in the step of coating the prepreg ply stack with a thermoplastic film, said thermoplastic film comprises:
    a polyether ether ketone or a polyether ketone ketone.

19. The method of claim 16, wherein, in the step of co-curing the prepreg ply stack comprising the thermoplastic film, the prepreg ply stack is co-cured at a temperature ranging from about 250° F. to about 350° F.

20. The method of claim 16, wherein said fiber-containing component comprising at least one of: carbon fibers, glass fibers, boron fibers, aramid fibers, or combinations thereof.

21. The method of claim 16, wherein the coefficient of thermal expansion of the thermoplastic film is greater than the coefficient of thermal expansion of the prepreg ply stack.

22. The method of claim 16, wherein, the prepreg plies each comprises a B-stage epoxy-resin.

23. The method of claim 16, wherein, the prepreg plies comprise an epoxy-resin containing component comprising at least one of:
    digylcidyl ethers of bisphenol A; diglycidyl ethers of bisphenol F; N,N,N',N'-tetragylcidyl-4,4'-diaminophenylmethane; p-amino phenol triglycidyl ether;
    epoxy phenol novolac resins; epoxy cresol novolac resins; 1,3,5-triglycidyl isocyanurate; tris(2,3-epoxypropyl) isocyanurate; glycerol diglycidyl ether;
    trimethylolpropane triglycidyl ether, or combinations thereof.

* * * * *